Figure 1:
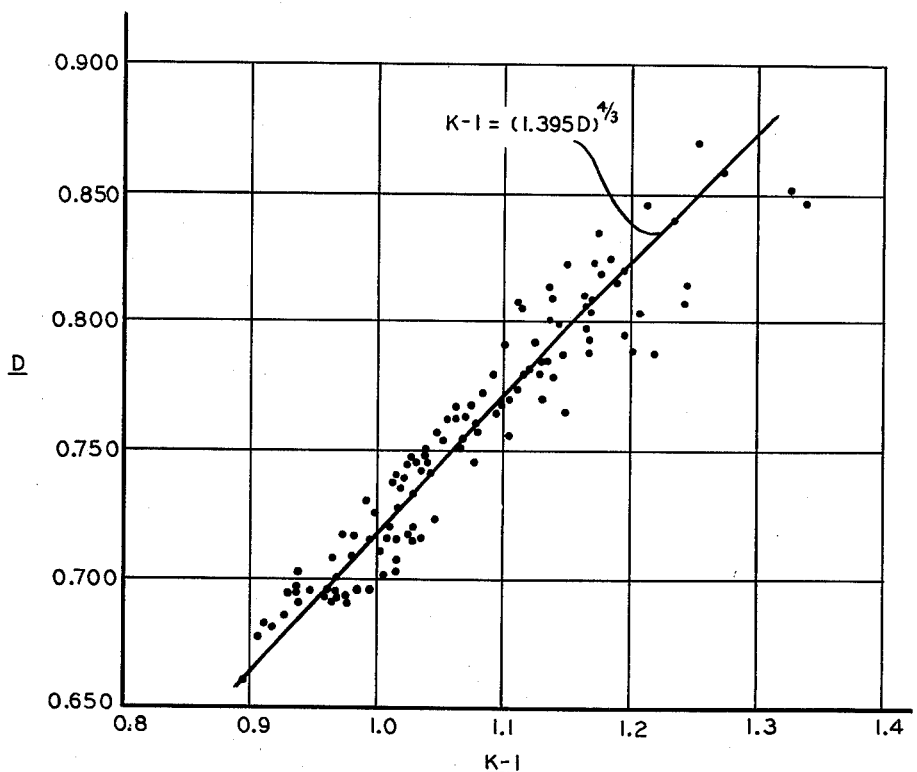

April 25, 1961 F. L. RYDER 2,981,105
CAPACITANCE TYPE FLUID MEASURING APPARATUS
Filed June 2, 1958 2 Sheets-Sheet 1

INVENTOR
FREDERICK L. RYDER
BY
Byerly, Townsend, Watson & Churchill
ATTORNEYS.

April 25, 1961 F. L. RYDER 2,981,105
CAPACITANCE TYPE FLUID MEASURING APPARATUS
Filed June 2, 1958 2 Sheets-Sheet 2

INVENTOR
FREDERICK L. RYDER
BY
Byerly, Townsend, Watson & Churchill
ATTORNEYS.

United States Patent Office 2,981,105
Patented Apr. 25, 1961

2,981,105

CAPACITANCE TYPE FLUID MEASURING APPARATUS

Frederick L. Ryder, Lynbrook, N.Y., assignor to Simmonds Precision Products, Inc., a corporation of New York Filed June 2, 1958, Ser. No. 739,337

8 Claims. (Cl. 73—304)

The present invention relates to capacitance type fluid measuring apparatus and particularly to apparatus for indicating within prescribed limits of accuracy the mass of fluid in a container.

In the conventional rebalancing bridge type of capacitance gauge a measuring condenser having spaced electrodes is immersed in the fluid in the container and its change in capacitance with change in liquid level is employed to control an indicator. For this purpose the measuring condenser is connected in one arm and a reference condenser is connected in an opposing arm of a bridge circuit in which a pair of voltage sources constitute the other two arms. A phase sensitive detector-amplifier responsive to the bridge output is coupled through a rebalancing motor to vary the voltage applied to the reference condenser thereby maintaining bridge balance.

When a gauge of the above type is employed to measure the quantity of fuel in an aircraft fuel tank it is now conventional practice to calibrate the indicator in terms of mass or weight. If the measuring condenser is profiled or characterized such that the dry capacitance of the immersed portion is at all times proportional to the corresponding volume of the associated tank then it will provide an accurate indication of weight so long as it can be assumed that the capacity index $(K-1)/D$, where $K$ and $D$ are the dielectric constant and density of the fuel, respectively, is a constant. Unfortunately this assumption is not valid in practice, particularly with the wide range of fuels now in use, and some means is required to compensate for capacity index variation.

In the copending application of Stanley J. Smith, Serial No. 187,948, filed October 2, 1950, a circuit is described and claimed utilizing an immersed reference condenser in combination with a fixed reference condenser for achieving appropriate compensation. The accuracy of such arrangement is predicated upon the assumption of a linear relationship between the capacity index and the dielectric constant, which assumption is valid within tolerable limits of accuracy.

It has been discovered, however, that the same group of fuels considered in the Smith application can be represented within substantially the same limits of accuracy by an exponential equation relating dielectric constant to density. More specifically it has been found that the various fuels under consideration can be represented within predetermined tolerable limits by the general exponential equation $$K-1=(bD)^n \qquad (1)$$

where $b$ and $n$ have the approximate values, respectively, of 1.395 and 4/3 when $D$ is expressed in terms of grams per cubic millilitre. In general the values of $b$ and $n$ can be varied depending upon the range of fluids to be measured so long as $n$ has a value other than 0 or 1.

Therefore, in accordance with one aspect of the present invention, there is provided measuring apparatus of the foregoing type comprising a measuring condenser constructed and arranged with respect to the container in which it is to be employed such that its capacity is proportional to $C_0+V^n(K-1)$ where $C_0$ represents the total dry capacitance of the condenser and $V$ represents the volume of fluid in the container; means connecting the measuring condenser in a first circuit for producing a current therein having a first component proportional to $C_0$ and a second component proportional to $V^n(K-1)$; a second circuit including means for producing a third component of current having a magnitude equal to the first component, and means for producing therein a variable component of current; balancing means coupled to both the first and second circuits responsive to any inequality between the sum of the first and second components and the sum of the third and variable components of current for adjusting the variable component in a direction to reduce the inequality to zero; and means coupled to the balancing means responsive to the adjustment of the variable component for providing an indication proportional to the $n$th root of the magnitude of the adjustment, whereby the indication represents the mass of fluid in the container.

The relationship between the volume and height of liquid in a container can be represented by the equation $$V=|f(H)| \qquad (2)$$

where $f$ represents any function of the height $H$. Therefore, in accordance with another aspect of the invention there is provided a novel measuring condenser whose electrodes are constructed and arranged such that the effective cooperating width versus height characteristic of the electrodes is represented by the equation $$A' \propto \frac{d|f(H)|^n}{dH} \qquad (3)$$

where $A'$ is the effective cooperating width at any height, and $|f(H)|$, $H$, and $n$ are as previously defined.

Figure 2:
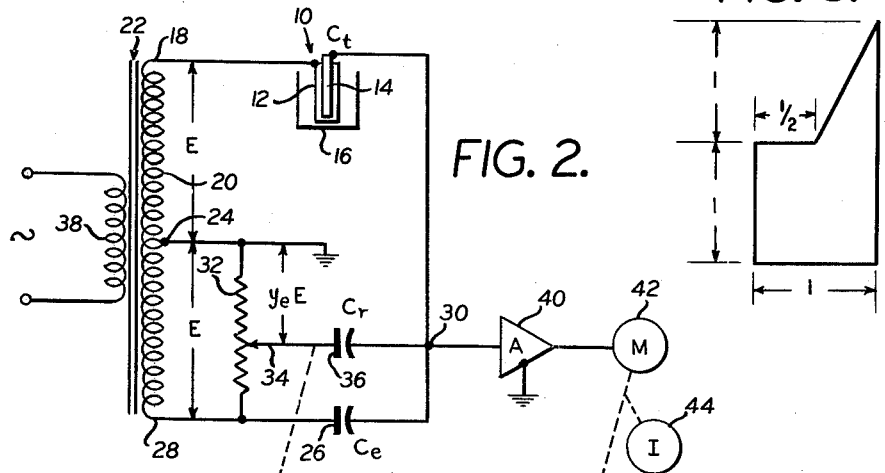
Figure 3:
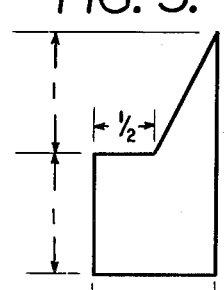
Figure 4:
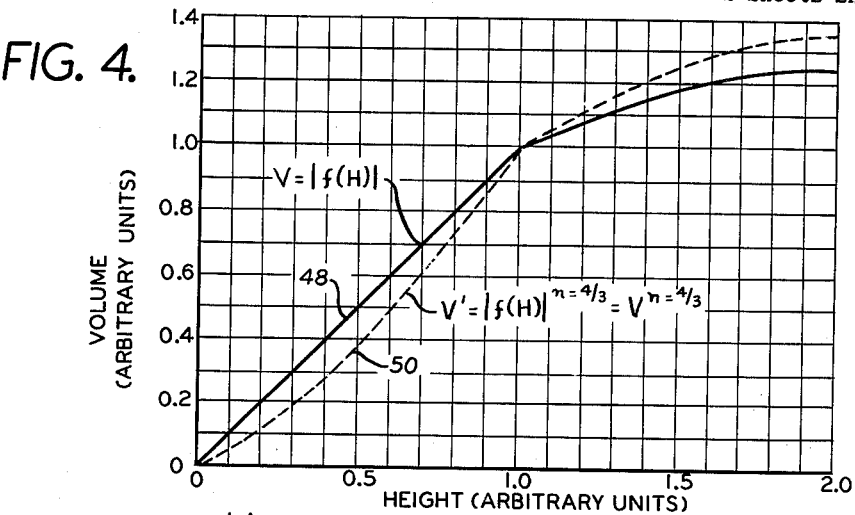

A better understanding of the invention will be had after reading the following detailed description with reference to the appended drawings in which:

Figure 1 is a graph showing the relationship between density and dielectric constant for a wide range of aviation fuels, Figure 2 is a schematic circuit diagram of a simplified typical rebalancing bridge circuit useful in explaining the operation of the present invention, Figure 3 is a diagrammatic representation of the cross-section of a container which will be used to describe the invention, Figure 4 consists of two graphs showing the volume versus height characteristic of the container of Figure 3, and of a fictitious container of volume $$V'=|f(H)|^{n4/3}$$

Figure 5:
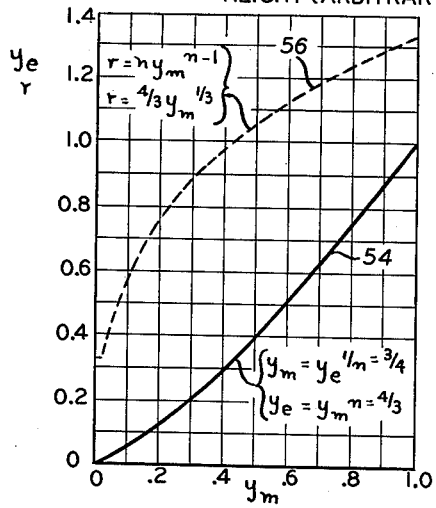
Figure 6:
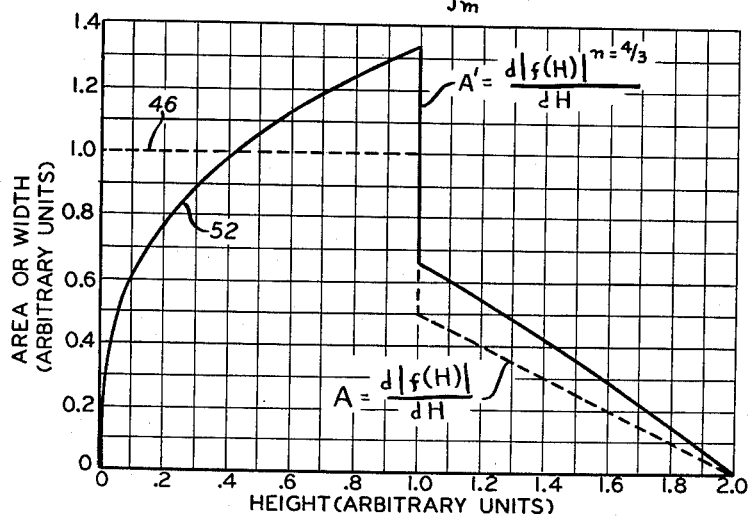

Figure 5 consists of a pair of graphs showing the characteristics required of the rebalancing potentiometer or other indicating means for yielding an output proportional to the $n$th root of the rebalancing adjustment, and Figure 6 consists of a pair of graphs illustrating the profiling required of the measuring condenser both according to the invention and according to present conventional practice.

Referring to Figure 1, there has been plotted the results of measurements of the dielectric constant and density, as collected from numerous sources, of a representative group of aviation fuels now in use. For convenience, the factor $K-1$ rather than the quantity $K$ has been employed for the abscissa. The individual measurements are represented by the dots on the graph. Superimposed upon the plot of the fuel characteristics is the exponential curve represented by the equation $$K-1=(1.395D)4/3 \qquad (4)$$

The values chosen for the constants $b$ and $n$ are those previously noted which are applicable to the range of fuels considered. It can be readily appreciated that the superimposed curve approximates fairly closely the mean of the distributed fuel points. Thus, if it is assumed that the density and dielectric constant of the fuels to be measured are related by Equation 4, the error involved will be limited to the extent that the various points on the graph of Figure 1 depart from the exponential curve.

The essential requirements of a circuit for indicating the mass of fluid in a container in accordance with the relationship expressed in Equation 4 is shown in Figure 2. A measuring condenser 10 having a pair of electrodes 12 and 14 is provided for immersion in the container 16. The electrode 12 is connected to the end terminal 18 of the secondary winding 20 of transformer 22. For convenience in explanation, the secondary winding 20 is provided with a center-tap 24 which is shown connected to ground. A condenser 26 having a fixed capacity $C_e$ is connected between the free end terminal 28 of the winding 20 and a junction point 30. A rebalancing potentiometer 32 is connected across the lower half of the winding 20 between the center-tap 24 and the terminal 28. The slider 34 of the potentiometer is connected through a condenser 36 of capacity $C_r$ to the junction point 30. The electrode 14 of the measuring condenser is also connected to the junction 30. The transformer 22 is provided with a primary winding 38 which may be connected to a source of alternating current. A phase detector-amplifier 40 has its input connected to the output of the bridge circuit between junction 30 and ground. The output of the detector-amplifier 40 is coupled to a conventional two-phase rebalancing motor 42 which is mechanically coupled both to an indicator 44 and to the slider 34 of the potentiometer 32. In the circuit thus described, if there is any change in the capacity of condenser 10, a signal will be supplied to the motor 42 causing it to reposition the slider 34 in a direction tending to reduce the signal to zero and rebalance the bridge.

Let the capacitance $C_t$ of the measuring condenser 10 be represented by the relationship $$C_t \alpha C_o + V \cdot C_o (K-1) \quad (5)$$

where the terms are as previously defined. The current components through the various arms of the bridge can be represented by the following relationship at balance:

$$EC_o + EV \cdot C_o (K-1) \alpha EC_e + y_e E C_r \quad (6)$$

where E represents the voltage output of the transformer as shown in Figure 2 and $y_e$ represents the selected fraction of the electrical range of the potentiometer 32 picked off by the slider 34.

The capacitance $C_e$ of condenser 26 can be readily chosen equal to $C_o$ so that relationship 6 becomes:

$$EV \cdot C_o (K-1) \alpha y_e E C_r$$

or $$V \cdot C_o (K-1) \alpha y_e C_r \quad (7)$$

after dropping out the E term for each side thereof.

Let the measuring condenser be so constructed that V is represented as a new quantity V' where:

$$V' - |f(H)|^n = V^n \quad (8)$$

and V and $|f(H)|$ are related in accordance with Equation 2. The special case of $n=4/3$ will be discussed in further detail after the analysis of the general situation.

It will be appreciated from the above that $EC_o$ represents a first component of current proportional to $C_o$, $EV \cdot C_o (K-1)$ represents a second component of current proportional to $V \cdot (K-1)$ or $V^n (K-1)$, $EC_e$ represents a third component of current having a magnitude equal to said first component, and $y_e EC_r$ represents a variable component of current.

Now substituting the value for V obtained from Equation 8 in relationship 7 there is obtained $$V^n C_o (K-1) \alpha y_e C_r \quad (9)$$

Solving for $y_e$ and introducing the value of $K-1$ from Equation 1 yields:

$$y_e \alpha \frac{V^n C_o (bD)^n}{C_r} = \frac{V^n C_o b^n D^n}{C_r} \quad (10)$$

Since the mass $W=DV$, Equation 10 can be rewritten $$y_e \alpha \frac{(VD)^n C_o b^n}{C_r} = \frac{W^n C_o b^n}{C_r} \quad (11)$$

It thus becomes apparent that W will be represented by the $n$th root of $y_e$, or $y_e^{1/n} = Wk$ where $k$ is a constant.

Several alternatives may be employed for deriving the $n$th root as required above. The preferred method is to characterize the potentiometer 32 such that the mechanical position of the wiper arm or contact 34 is related to the electrical output by the exponential equation:

$$y_m = y_e^{1/n} \quad (12)$$

where $y_m$ represents the fractional portion of the full mechanical range of the potentiometer.

Alternatively the potentiometer can be linear and the dial on the indicator can be calibrated in accordance with the exponential equation:

$$y_s = (y_1)^{1/n} \quad (13)$$

where $y_s$ represents the fractional part of the full scale range and $y_1$ represents the fractional part of the complete range of mechanical movement of the indicator. Thus it can be seen that by characterizing the measuring condenser such that its capacitance varies as a function of $V^n$, and by reciprocally characterizing the readout system such that it varies as function of $y_e^{1/n}$, a gauge is provided which operates in conformity with the relationship $K-1=(bD)^n$ to yield accurate indications of fluid mass or weight.

Now referring to Figure 3, a vertical cross-section of an arbitrarily selected tank is illustrated. The units for the dimensions shown on the drawing may likewise be considered arbitrary and it is assumed that the length of the tank normal to the paper is unity. In Figure 6, the broken line curve 46 is a plot of the horizontal cross-sectional area A versus height H for the tank of Figure 3. The volume of the tank of Figure 3 is plotted as a functoin of height H as the solid line curve 48 of Figure 4. The curve 48 is thus a plot of the general Equation 2 for the specific case illustrated in Figure 3. It follows, therefore, that the curve 46 in Figure 6 can be represented by the equation:

$$A = \frac{d|f(H)|}{dH}$$

Curve 46 also represents the theoretical shape or profiling of the electrodes of a conventional measuring condenser.

The broken line curve 50 in Figure 4 represents a plot of Equation 8 for the tank of Figure 3 where $n$ has a value of 4/3. This curve, or at least the equation therefor, is now differentiated and the derivative with respect to H is plotted as the solid line curve 52 in Figure 6. The equation for curve 52 is as follows:

$$A' = \frac{d|f(H)|^{n=4/3}}{dH} \quad (14)$$

This is similar to the proportional relationship 3 set out previously. Equation 14 can be assumed to represent the horizontal cross-sectoinal area of a fictitious tank of volume $V^{n=4/3}$. In accordance with the present invention curve 52 defines the required characterization of the electrodes of the measuring condenser. That is curve 52 in Figure 6 shows the required profile for the special case of $n=4/3$ and a tank as shown in Figure 3. Therefore, in order to obtain the required characterization of the measuring condenser it is merely necessary to plot the curve of Equation 14 for the particular container or tank under consideration.

In Figure 5 there is shown in solid line by the curve 54 the relationship required between $y_m$ and $y_e$ for the potentiometer 32. The broken line curve 56 shows $r$, the relative resistance of the resistance element of potentiometer 32 per unit change in mechanical position of the slider 34, which is plotted as a function of $y_m$. For practical reasons it is preferred not to allow $r$ to become less than some small value as shown in Figure 5. If this value is, for example, ¼ of its maximum value (¼ of the maximum value of 1.33 for the present example) then the value of $y_m$ below which $r$ is constant is 1/64 and the maximum error caused by leveling $r$ off is about 0.13% of full range. The curve 56 is actually a plot of the equation:

$$r = n y_m^{n-1} \quad (15)$$

Where $n$ is 4/3 this becomes $$r = \frac{4}{3} y_m^{1/3}$$

The invention has been described in both general and specific terms. The specific terms apply to the particular selection of fuels plotted in Figure 1 and to the tank configuration shown in Figure 3. However, the coefficient and exponent of Equation 1 can vary if for example the measuring apparatus is intended for use with other fluids. All that is required is that the relationship between the dielectric constant and the density of the fluid being measured be, for the range of fluids to be measured, defined within predetermined tolerable limits by the exponential Equation 1 as set forth above. It is also contemplated that the values for $b$ and $n$ may be varied slightly for the same range of fluids depending upon the degree of accuracy desired. For example, Equation 4 may be rewritten without appreciable loss in accuracy as $$K - 1 = (1.377 D)^{1.3}$$

the value for $b$ being varied slightly to allow for the rounding off of the exponent $n$. Various other changes and modifications will occur to those skilled in the subject art and these are contemplated as falling within the purview of the present invention as defined in the appended claims.

What is claimed is:

1. Capacitance type fluid measuring apparatus for indicating the mass of fluid in a container when the relationship between the dielectric constant (K) and the density (D) of the fluid being measured is for the range of fluids to be measured defined within predetermined tolerable limits by the exponential equation $$K - 1 = (bD)^n$$

where $b$ and $n$ are constants with $n$ being other than 0 or 1, comprising in combination: a measuring condenser having spaced electrodes immersible in the fluid in the container and constructed and arranged with respect to said container such that its capacity is proportional to $C_0 + V^n(K-1)$ where $C_0$ represents the total dry capacitance of said condenser and V represents the volume of fluid in the container; means connecting said measuring condenser in a first circuit for producing a current therein having a first component proportional to $C_0$ and a second component proportional to $V^n(K-1)$; a second circuit including means for producing therein a third component of current having a magnitude equal to said first component, and means for producing therein a variable component of current; balancing means coupled to both said first and second circuits responsive to any inequality between the sum of said first and second components and the sum of said third and variable components of current for adjusting said variable component in a direction to reduce said inequality to zero; and means coupled to said balancing means responsive to the adjustment of said variable component for providing an indication proportional to the $n$th root of the magnitude of said adjustment, whereby said indication represents the mass of fluid in the container.

2. Capacitance type fluid measuring apparatus according claim 1, wherein $b$ and $n$ have the approximate values, respectively, of 1.395 and 4/3 when D is expressed in terms of grams per cubic millilitre.

3. Capacitance type fluid measuring apparatus according to claim 1, wherein said means for providing an indication comprises a non-linear scale calibrated in accordance with the equation $y_s = (y_i)^{1/n}$ where $y_s$ and $y_i$ represent the fractional parts of the total scale and indicator range, respectively.

4. Capacitance type fluid measuring apparatus for indicating the mass of fluid in a container when the relationship between the dielectric constant (K) and the density (D) of the fluid being measured is for the range of fluids to be measured defined within predetermined tolerable limits by the exponential equation $$K - 1 = (bD)^n$$

where $b$ and $n$ are constants with $n$ being other than 0 or 1, comprising in combination: a measuring condenser having spaced electrodes immersible in the fluid in the container and constructed and arranged with respect to said container such that its capacity is proportional to $C_0 + V^n(K-1)$ where $C_0$ represents the total dry capacitance of said condenser and V represents the volume of fluid in the container; means connecting said measuring condenser in a first circuit for producing a current therein having a first component proportional to $C_0$ and a second component proportional to $V^n(K-1)$; a second circuit including means for producing therein a third component of current having a magnitude equal to said first component, and means including a potentiometer for producing therein a variable component of current; balancing means coupled to both said first and second circuits responsive to any inequality between the sum of said first and second components and the sum of said third and variable components of current for adjusting the electrical output of said potentiometer to vary said variable component in a direction to reduce said inequality to zero; and means coupled to said balancing means responsive to the mechanical adjustment of said potentiometer for providing an indication, said potentiometer being constructed such that its mechanical output is related to its electrical output throughout at least the main portion of its entire range of operation by the equation $y_m = (y_e)^{1/n}$ where $y_m$ and $y_e$ represent the fractional parts of its total mechanical and electrical range, respectively, whereby said indication represents the mass of fluid in the container.

5. Capacitance type fluid measuring apparatus for indicating the mass of fluid in a container, when the relationship between the dielectric constant (K) and the density (D) of the fluid being measured is for the range of fluids to be measured defined within predetermined tolerable limits by the exponential equation $$K - 1 = (bD)^n$$

where $b$ and $n$ are constants with $n$ being other than 0 or 1, comprising in combination: a measuring condenser having spaced electrodes immersible in the fluid in the container and constructed and arranged with respect to said container such that its capacity is proportional to $C_0 + V^n(K-1)$ where $C_0$ represents the total dry capacitance of said condenser and V represents the volume of fluid in the container; a reference condenser having a normally fixed capacity; a first source of alternating voltage of constant magnitude, circuit means connecting said measuring condenser to said first source of alternating voltage for producing a current of a first phase which is a function of the capacity of said measuring condenser; means for producing a current of a phase opposite to said current of a first phase, including a source of alternating voltage of a variable magnitude and of a phase opposite to said first source, circuit means connecting said reference condenser to said variable source of alternating voltage for producing a component of variable current, substantially opposite in phase to said current of said first phase, and proportional to the magnitude of said variable source of voltage; means connected between a first output point common to said voltage sources and a second output point common to said measuring condenser and said reference condenser and responsive to any output voltage resulting from the current of said first phase and the current of said opposite phase, for adjusting the magnitude of said variable source of voltage in a direction to reduce said output voltage to zero, and means responsive to the adjustment of said variable source of voltage for indicating the mass of fluid in the container, said last mentioned means having a characteristic such that its indications are proportional to the $n$th root of the magnitude of the adjustment of said variable source.

6. Capacitance type fluid measuring apparatus for indicating the mass of fluid in a container when the relationship between the dielectric constant (K) and the density (D) of the fluid being measured is for the range of fluids to be measured defined within predetermined tolerable limits by the exponential equation $$K-1=(bD)^n$$

where $b$ and $n$ are constants with $n$ being other than 0 or 1, comprising in combination: a measuring condenser having spaced electrodes immersible in the fluid in the container and constructed and arranged with respect to said container such that its capacity is proportional to $C_o+V^n(K-1)$ where $C_o$ represents the total dry capacitance of said condenser and V represents the volume of fluid in the container; a reference condenser having a normally fixed capacity; a first source of alternating voltage of constant magnitude; circuit means connecting said measuring condenser to said first source of alternating voltage for producing a current of a first phase which is a function of the capacity of said measuring condenser; means for producing a current of a phase opposite to said current of a first phase, including a potentiometer coupled to a source of alternating voltage of a phase opposite to said first source for providing a voltage of variable magnitude and of said opposite phase, circuit means connecting said reference condenser to the output of said potentiometer for producing a component of variable current, substantially opposite in phase to said current of said first phase, and proportional to the magnitude of said variable voltage; means connected between a first output point common to said voltage sources and a second output point common to said measuring condenser and said reference condenser and responsive to any output voltage resulting from the current of said first phase and the current of said opposite phase, for adjusting said potentiometer in a direction to reduce said output voltage to zero, and means responsive to the adjustment of said potentiometer for indicating the mass of fluid in the container, said potentiometer having a characteristic such that its mechanical output is related to its electrical output throughout at least the major portion of its entire range of operaion by the equation $y_m=(y_e)^{1/n}$ where $y_m$ and $y_e$ represent the fractional parts of its total mechanical and electrical range, respectively.

7. Capacitance type fluid measuring apparatus according to claim 6, wherein $b$ and $n$ have the approximate values, respectively, of 1.395 and 4/3 when D is expressed in terms of grams per cubic millilitre.

8. Capacitance type fluid measuring apparatus for indicating the quantity of fluid in a container when the relationship between the volume (V) and height (H) of the fluid being measured in the container is defined by the equation $$V=|f(H)|$$

where $f$ represents any function of H, comprising a measuring condenser having spaced electrodes immersible in the fluid in the container, said electrodes being constructed and arranged such that the effective cooperating width versus height characteristic of the electrodes is represented by the equation $$A' \alpha \frac{d|f(H)|^n}{dH}$$

where $A'$ is the cooperating width at any height H, and $n$ is a constant other than 0 or 1 determined by the exponential equation $$K-1=(bD)^n$$

defining within predetermined tolerable limits the relationship between the dielectric constant (K) and the density (D) of the fluid being measured for the range of fluids to be measured where $b$ is also a constant.

References Cited in the file of this patent

UNITED STATES PATENTS

| | | |
|---|---|---|
| 2,540,658 | De Giers et al. | Feb. 6, 1951 |
| 2,582,399 | Smith | Jan. 15, 1952 |
| 2,841,164 | Williamson | July 1, 1958 |
| 2,918,818 | Meyer | Dec. 29, 1959 |